(12) United States Patent
Desai

(10) Patent No.: US 8,369,323 B1
(45) Date of Patent: Feb. 5, 2013

(54) MANAGING VOICE-BASED DATA COMMUNICATIONS WITHIN A CLUSTERED NETWORK ENVIRONMENT

(75) Inventor: Purvi Desai, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 416 days.

(21) Appl. No.: 12/108,884

(22) Filed: Apr. 24, 2008

Related U.S. Application Data

(60) Provisional application No. 61/027,196, filed on Feb. 8, 2008.

(51) Int. Cl.
 *H04L 12/28* (2006.01)
(52) U.S. Cl. ......... 370/389; 370/351; 370/216; 370/229
(58) Field of Classification Search .................. 370/352, 370/389.2, 389, 356, 392, 401, 474, 476; 709/204–207, 224, 226, 227, 225
See application file for complete search history.

(56) References Cited

U.S. PATENT DOCUMENTS

| | | | |
|---|---|---|---|
| 6,865,681 | B2 | 3/2005 | Nuutinen |
| 7,185,094 | B2 | 2/2007 | Marquette et al. |
| 7,340,771 | B2 | 3/2008 | Chan et al. |
| 7,529,354 | B2 | 5/2009 | Kiss et al. |
| 7,561,575 | B2 | 7/2009 | Biswas et al. |
| 7,738,469 | B1 | 6/2010 | Shekokar et al. |
| 7,751,536 | B1 | 7/2010 | Abramson et al. |
| 7,764,699 | B2 | 7/2010 | Jennings et al. |
| 7,765,294 | B2 | 7/2010 | Edwards et al. |
| 2002/0131575 | A1 | 9/2002 | Gallant |
| 2002/0184376 | A1* | 12/2002 | Sternagle ..................... 709/230 |
| 2003/0110257 | A1* | 6/2003 | Hyun et al. .................... 709/224 |
| 2006/0023657 | A1* | 2/2006 | Woodson et al. ............. 370/328 |
| 2006/0075483 | A1 | 4/2006 | Oberle et al. |
| 2006/0146792 | A1 | 7/2006 | Ramachandran et al. |
| 2006/0218624 | A1 | 9/2006 | Ravikumar et al. |
| 2006/0235980 | A1* | 10/2006 | Pote et al. ..................... 709/227 |
| 2006/0239255 | A1 | 10/2006 | Ramachandran et al. |
| 2006/0242300 | A1* | 10/2006 | Yumoto et al. ................ 709/226 |
| 2006/0291480 | A1* | 12/2006 | Cho et al. ...................... 370/397 |
| 2007/0121673 | A1 | 5/2007 | Hammer |

(Continued)

FOREIGN PATENT DOCUMENTS

WO 2005043814 A1 5/2005

OTHER PUBLICATIONS

U.S. Appl. No. 12/102,138, filed Apr. 14, 2008, entitled "Session Layer Pinhole Management Within a Network Security Device,".

(Continued)

*Primary Examiner* — Hassan Phillips
*Assistant Examiner* — Anez Ebrahim
(74) *Attorney, Agent, or Firm* — Shumaker & Sieffert, P.A.

(57) ABSTRACT

This disclosure relates to managing voice-based data communications within a clustered network environment using application-layer functionality, and more particularly to a primary network device within a cluster that manages transmissions related to a communication and synchronizes state information associated with the communication to other network devices within the cluster. One exemplary method includes receiving, by a network device in a cluster, information associated with a data communication between a first user device and a second user device, and analyzing, by the network device, the received information using application-layer functionality to identify a primary network device that manages the data communication. When the network device is not the primary network device, the network device forwards the received information to the primary network device. Upon receipt of the information, the primary network device provides updated state information for the communication with other network devices within the cluster for synchronization purposes.

20 Claims, 8 Drawing Sheets

U.S. PATENT DOCUMENTS

| | | | |
|---|---|---|---|
| 2007/0124813 | A1 | 5/2007 | Ormazabal et al. |
| 2007/0201473 | A1 | 8/2007 | Bhatia et al. |
| 2007/0209067 | A1 | 9/2007 | Fogel |
| 2008/0037517 | A1 | 2/2008 | Emborg |
| 2008/0052401 | A1 | 2/2008 | Bugenhagen et al. |
| 2008/0052556 | A1* | 2/2008 | Donovan et al. .................. 714/4 |
| 2008/0270618 | A1 | 10/2008 | Rosenberg |
| 2009/0205039 | A1 | 8/2009 | Ormazabal et al. |
| 2010/0131621 | A1 | 5/2010 | Zetterlund et al. |
| 2010/0220718 | A1 | 9/2010 | Hoffmann |
| 2011/0010752 | A1 | 1/2011 | Hunyady et al. |

OTHER PUBLICATIONS

D. Richard Kuhn et al., "Security Considerations for Voice Over IP Systems," National Institute of Standards and Technology, NIST Special Publication 800-58, Jan. 2005, 99 pages.

Office Action from U.S. Appl. No. 12/102,138, dated Mar. 18, 2011, 16 pp.

Response to Office Action dated Mar. 18, 2011, from U.S. Appl. No. 12/102,138, filed Jun. 20, 2011, 15 pp.

* cited by examiner

MANAGING VOICE-BASED DATA COMMUNICATIONS WITHIN A CLUSTERED NETWORK ENVIRONMENT

RELATED APPLICATION

This application claims the benefit of U.S. Provisional Application No. 61/027,196, filed Feb. 8, 2008, the entire contents of which is incorporated herein by reference.

TECHNICAL FIELD

This disclosure relates to managing one or more data communications within a clustered network environment.

BACKGROUND

In a clustered network environment, two or more network devices typically manage the flow of communication between various external endpoints. For example, a user device in one enterprise system may wish to communicate with a user device of another enterprise system. These two user devices may establish a data communication via the clustered network environment. One or more of the network devices in the cluster may assist in the management of the data flow for this data communication.

In certain cases, users of these user devices may wish to establish a voice-based communication, such as a Voice-Over-Internet-Protocol, or VoIP, call. In managing a VoIP call, network devices within a clustered environment may need to maintain call state information for the duration of that call. Such state information may include session information, address translation information, pinhole information, or other call-related information. In a load-balanced environment, or in a cluster that routes information through various different devices, it is possible that multiple different network devices within the cluster will receive and handle data packets associated with one given call. In these scenarios, state information for the call needs to be synchronized between all of such devices. As a result, due to possible latency in the system, it is possible that one network device may receive a packet for the call before its state has been synchronized, meaning that the packet could be dropped, or that the security of the call could become compromised.

SUMMARY

In general, the disclosure relates to managing data communications within a clustered network environment using application-layer functionality, and more particularly to a primary network device within a cluster that manages transmissions related to a data communication and synchronizes state information associated with the communication to other network devices within the cluster. The clustered network environment may be a high-availability environment that may further provide load-balancing amongst devices in the cluster. The primary network device may be identified when a request is received by the cluster to establish a data communication, such as a voice-based call, with a user device. The primary network device is then activated as a primary device to process subsequent information associated with the data communication, which may be identified by application context information for the data communication, such as, for example, a call identifier. Other network devices within the cluster that may receive information for the communication are responsible for forwarding such information to the primary network device. The primary network device is responsible for continually providing updated state information associated with the communication to other network devices within the cluster for synchronization purposes. Thus, in the case of a failure (e.g., hardware failure, software failure) of the primary network device, another device within the cluster is capable of dynamically taking over responsibility as the primary device for the communication.

In some embodiments, a method includes receiving, by a network device in a cluster, information associated with a data communication between a first user device and a second user device, and analyzing, by the network device, the received information using application-layer functionality to identify a primary network device within the cluster that manages the data communication. When the network device is not the primary network device, the network device forwards the received information to the primary network device.

In some embodiments, a network device includes an engine configured to receive information associated with a data communication between a first user device and a second user device, and further configured to analyze the received information using application-layer functionality to identify a primary network device that manages the data communication within a cluster of network devices. When the network device is not the primary network device, the engine is further configured to forward the received information from the network device to the primary network device.

In some embodiments, a method includes receiving, by a first network device within a cluster of network devices, a request from a first user device using an application-layer protocol (such as, for example, a session-initiation protocol) to establish a voice-based data communication with a second user device, and activating the first network device as a primary device using application-layer functionality, such that the first network device processes subsequent information associated with the data communication between the first and second user devices. The method further includes sending initial state information associated with the request from the first network device to a second network device within the cluster using application-layer functionality, and sending the request from the first network device to establish the data communication with the second user device. In some embodiments, the method further includes experiencing a failure in the first network device, and activating the second network device as the primary device using application-layer functionality, such that the second network device processes subsequent information associated with the data communication.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
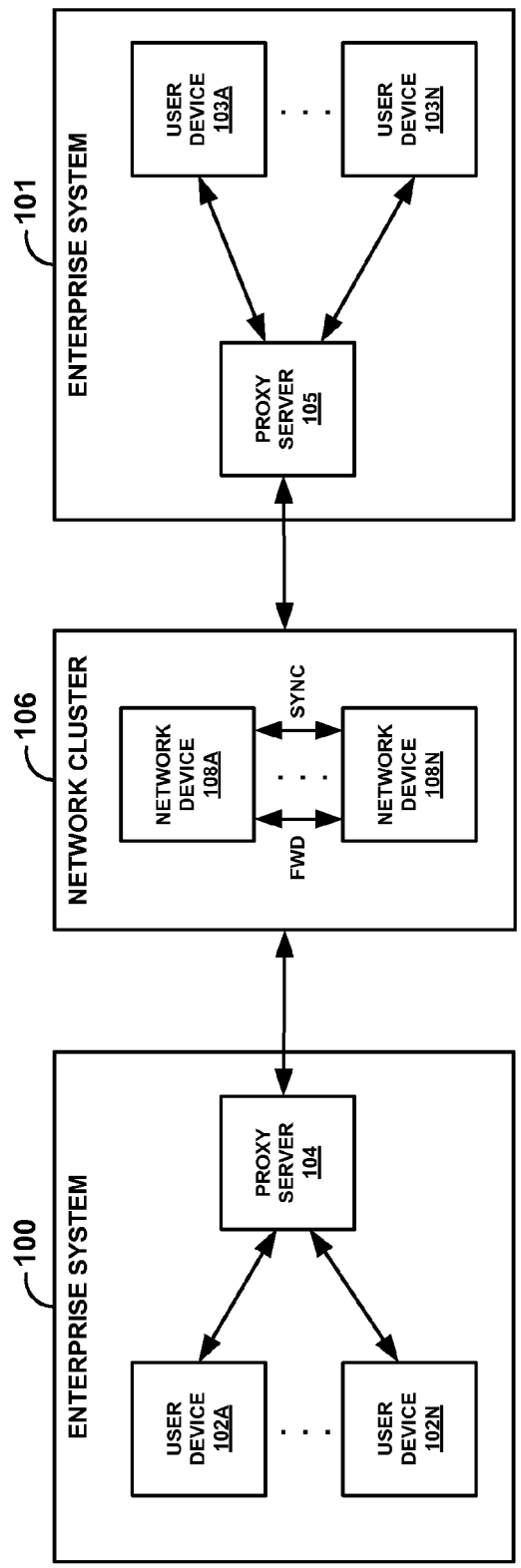
FIG. 1 is a block diagram illustrating user devices within different enterprise systems that are able to communicate with each other via a clustered network environment, according to certain embodiments.

FIG. 1 is a block diagram illustrating user devices within different enterprise systems that are able to communicate with each other via a clustered network environment, according to certain embodiments. As is shown in FIG. 1, a network cluster 106 provides a communication pathway between one enterprise system 100 and another enterprise system 101. Enterprise system 100 includes user devices 102A-102N that are each communicatively coupled to proxy server 104. Enterprise system 101 includes user devices 103A-103N that are each communicatively coupled to proxy server 105. A user may interact with any one of user devices 102A-102N in enterprise system 100 or any one of user devices 103A-103N in enterprise system 101. For example, if the user wishes to initiate a voice-based call to another remote user, the user may utilize one user device 102A of enterprise system 100 to establish a voice-based call with user device 103A of enterprise system 101 using an application-layer protocol, such as a session-initiation protocol. Network cluster 106 manages the voice-based call from initiation to termination using application-layer functionality, which includes management of one or more data packets that are communicated between users during the lifetime of the call, as will be discussed in more detail below.

Each enterprise system 100 and 101 may be a large-scale or small-scale system. In system 100, user devices 102A-102N may be co-located or remotely located with respect to each other. In addition, proxy server 104 may be co-located or remotely located with respect to user devices 102A-102N. Similarly, in system 101, user devices 103A-103N may be co-located or remotely located with respect to each other. And, proxy server 105 may be co-located or remotely located with respect to user devices 103A-103N. Proxy server 104 manages the interface between user devices 102A-102N and network cluster 106. As a result, user devices 102A-102N send outgoing data through proxy server 104, and receive incoming data from proxy server 104. Proxy server 105 manages the interface between user devices 103A-103N and network cluster 106.

Network cluster 106 includes network devices 108A-108N. Each network device is capable of processing data that is communicated between one enterprise system 100 and another enterprise system 101. In one embodiment, one or more of network devices 108A-108N may comprise firewalls. Because network cluster 106 includes multiple network devices 108A-108N that are each capable of processing communicated data, each enterprise system 100 and 101 need not identify a specific network device 108A-108N when transmitting data through network cluster 106. Instead, enterprise systems 100 and 101 may provide data to network cluster 106, and network cluster 106 is then dynamically capable of determining which network device 108A-108N will process such data. Typically, a data communication between enterprise system 100 and enterprise system 101 will include multiple data packets that are exchanged. In some embodiments, network cluster 106 provides load balancing functionality, such that different network devices within cluster 106 may handle different data packets associated with the same data communication (such as a voice-based call, for example). In these embodiments, network cluster 106 determines which network device 108A-108N will manage each incoming data packet that is received from enterprise system 100 or 101.

In some embodiments, network cluster 106 provides a high-availability environment in which each network device 108A-108N provides redundancy for failover. For example, if a first network device 108A has managed certain data packets within a data communication, this network device 108A is capable of synchronizing state data for the communication with other network devices in cluster 106 using application-layer functionality. If the first network device 108A then experiences a failure, one or more of the other network devices 108B-108N can continue to manage the data communication between enterprise systems 100 and 101 using up-to-date communication data.

In certain embodiments, a primary network device, such as device 108A, is identified by network cluster 106 to manage all data packets associated with a given data communication between enterprise systems 100 and 101. State maintenance and resource management for the data communication are more easily and efficiently achieved when one primary network device 108A manages the data communication. In addition, the primary network device 108A is also capable of maximizing security for the communication by functioning as a security device at the application layer, according to some embodiments. Different network devices within the set of devices 108A-108N may serve as primary devices for separate data communications between the enterprise systems 100 and 101, as well.

In a load-balanced environment, when one enterprise system 100 sends a first data packet of a data communication to another enterprise system 101 via network cluster 106, cluster 106 identifies a network device, such as device 108A, to manage this first data packet. In some embodiments, the network device that has been identified as the managing device for this first data packet becomes the primary device for all subsequent packets associated with the same data communication. In these embodiments, the primary network device, such as device 108A, manages all packets for the data communication, but is also responsible for synchronizing its state data for the communication with other network devices, such as devices 108B-108N in this example, within cluster 106 for redundancy. If other network devices 108B-108N within cluster 106 receive any of the subsequent data packets associated with the data communication, these network devices route, or forward, such packets to primary network device 108A for that communication. For example, if the data communication is a voice-based call between a user of enterprise system 100 and a user of enterprise system 101, any non-primary (or secondary) network devices 108B-108N within cluster 106 that receive data packets for the call will forward the packets to primary network device 108A. In this example, primary network device 108A is then responsible for synchronizing state data for the call with other network devices 108B-108N. Thus, as is shown in FIG. 1, each network device 108A-108N, in general, is capable of forwarding data to or synchronizing data with other network devices within cluster 106 using application-layer functionality.

In some embodiments, each network device 108A-108N within cluster 106 is a separate physical device. However, in other embodiments, network cluster 106 comprises one physical device, and each network device 108A-108N comprises a virtual device within cluster 106. Also, in certain embodiments, proxy server 104 within enterprise system 100 may not be needed or used, and proxy server 105 in system 101 may not be needed or used. In these embodiments, the user devices 102A-102N (system 100) and 103A-103N (system 101) are capable of directly communicating with network cluster 106.

Figure 2:
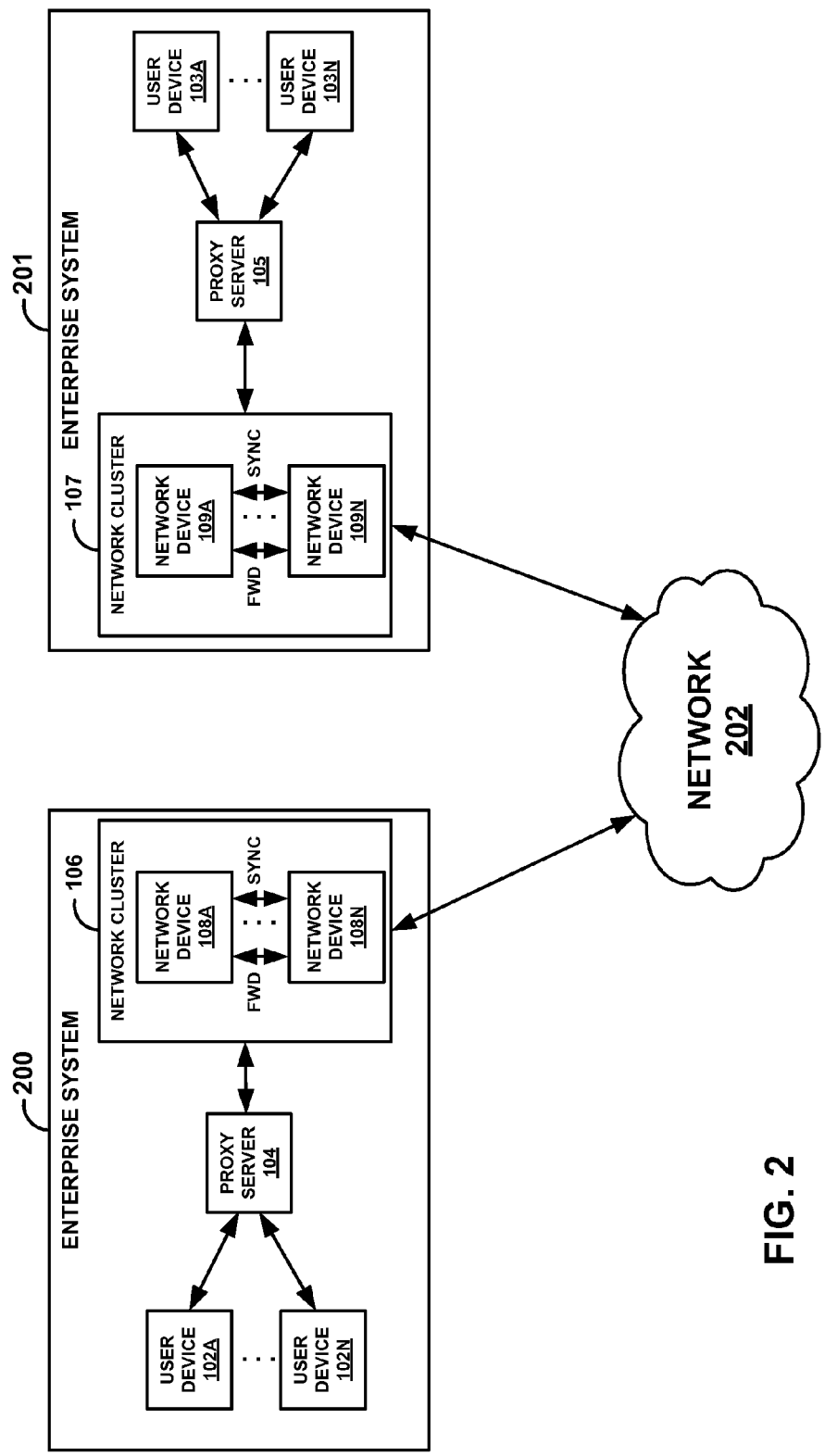
FIG. 2 is a block diagram illustrating enterprise systems that each include a network cluster, according to some embodiments.

FIG. 2 is a block diagram illustrating enterprise systems 200 and 201 that each include a network cluster, according to some embodiments. In these embodiments, enterprise system 200 includes user devices 102A-102N, proxy server 104, and network cluster 106 (which is shown as separate from enterprise system 100 in FIG. 1). Within enterprise system 200, user devices 102A-102N are communicatively coupled to proxy server 104 and network cluster 106 as described previously, but internal to enterprise system 200. Enterprise system 201 includes user devices 103A-103N, proxy server 105, and network cluster 107. User devices 103A-103N are communicatively coupled to proxy server 105 and network cluster 107. Network cluster 107 is similar to network cluster 106, and includes network devices 109A-109N. Network devices 109A-109N function similarly to network devices 108A-108N in cluster 106. One enterprise system 200 is capable of communicating with another enterprise system 201 via network 202. User devices 102A-102N are capable of communicating with user devices 103A-103N, as described previously with respect to FIG. 1, but network clusters 106 and 107 within each enterprise system 200 and 201 of FIG. 2, respectively, handles data flow to and from network 202 during any data communication between the enterprise systems 200 and 201.

Figure 3:
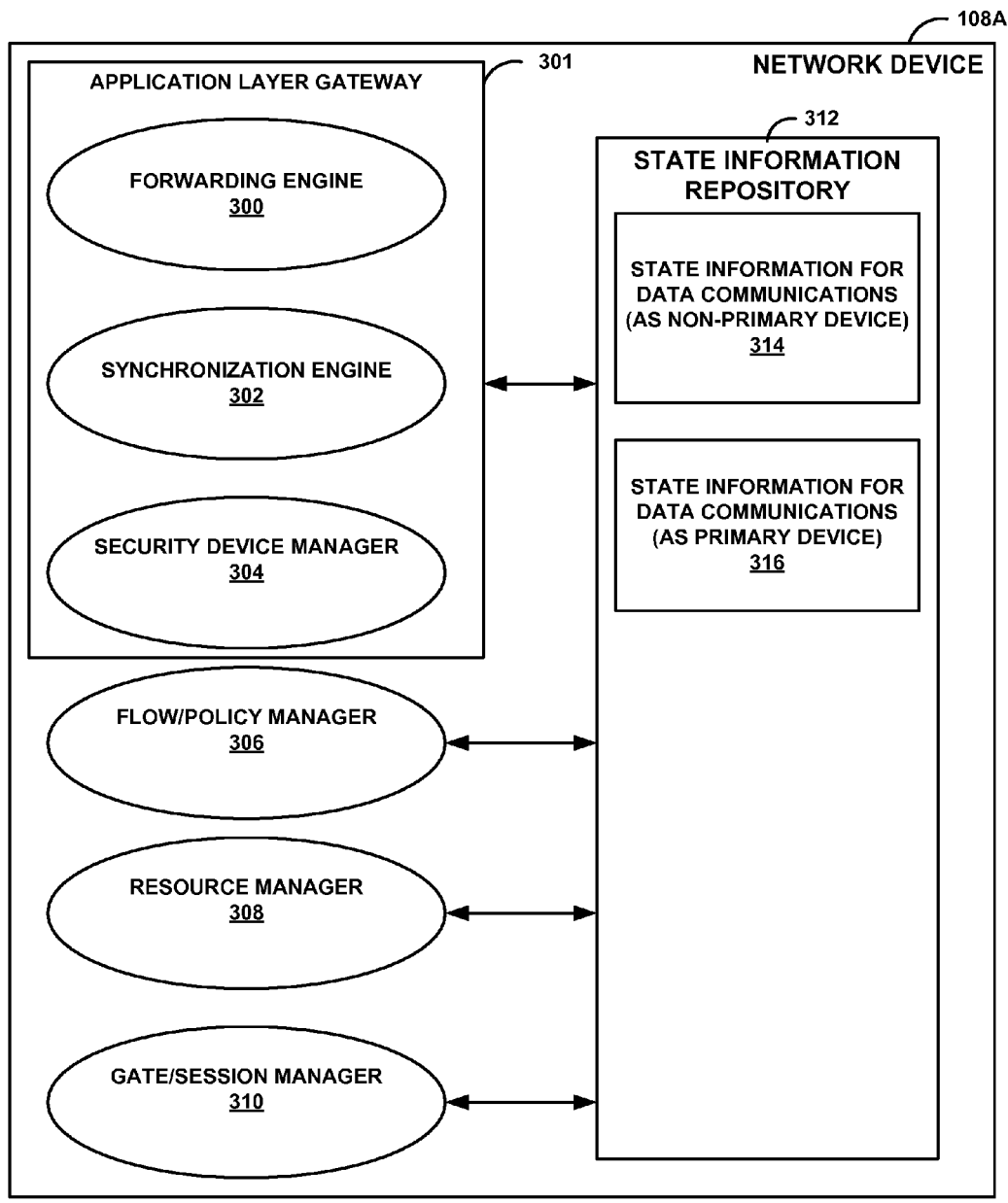
FIG. 3 is a diagram illustrating various functional components that may be included within an exemplary network device, according to some embodiments.

FIG. 3 is a diagram illustrating various functional components and a repository that may be included within an exemplary network device 108A, according to some embodiments. Exemplary network device 108A shown in FIG. 3 is part of network cluster 106, shown in both FIGS. 1 and 2. In some embodiments, each of the network devices 108A-108N in cluster 106 includes the various functional components and repository shown in FIG. 3. In some embodiments, each of the network devices 109A-109N in cluster 107 (FIG. 2) includes these functional components and repository, as well.

In FIG. 3, network device 108A includes functional components of an application layer gateway 301, a flow/policy manager 306, a resource manager 308, and a gate/session manager 310. Each functional component is capable of communicating with the other functional components. FIG. 3 further shows state information in state information repository 312 that is maintained by network device 108A. This includes state information 314 and state information 316, which are described in more detail below.

Application layer gateway 301 performs certain gateway functionality at an application layer (such as, for example, with reference to the OSI, or Open Systems Interconnect, communication stack), according to one embodiment. In this embodiment, application layer gateway 301 performs gateway functions at a layer above layers 2 and 3 in the OSI stack. Application layer gateway 301 includes a forwarding engine 300, a synchronization engine 302, and a security device manager 304, according to the embodiment of FIG. 3.

Forwarding engine 300 sends information (such as data packets associated with data communications) to, or receives information from, other entities, such as other network devices within cluster 106 or enterprise systems 100 and 101. Upon receiving information, forwarding engine 300 determines whether network device 108A needs to forward data packets for a data communication to another network device 108B-108N that is currently handling, or managing, that particular data communication. As noted above, a primary network device is the network device within cluster 106 (or cluster 107) that is responsible for processing all data packets for a given data communication. For a first data communication, network device 108A may be the primary device, and forwarding engine 300 may send information directly to external systems, such as system 100 or 101. However, for a second, separate data communication, another network device (such as network device 108B) may be the primary device. Forwarding engine 300 may identify this primary device by analyzing a portion of data contained within the received information, such as a unique communication identifier (such as a VoIP call ID) for the communication, sender's address, recipient's address, communication tags, and/or other identification data contained within the received information.

Forwarding engine 300 then compares this portion of data with state information maintained within repository 312 to identify the primary network device. This portion of data can be used as an index into one or more tables of the state information, according to some embodiments, to identify the primary network device. In some embodiments, forwarding engine 300 accesses state information within at least one of state information 314 and state information 316 to identify the primary network device. In some embodiments, security device manager 304 may be responsible, either separately or in conjunction with forwarding engine 300, for analyzing the portion of data contained within the received information to identify the primary network device.

If network device 108A receives one or more data packets associated with this second data communication from enterprise system 100 or 101, for example, forwarding engine 300 forwards such packets to the primary network device of such communication. Forwarding engine 300 also interacts with state information repository 312 to retrieve state information for certain communications.

When forwarding engine 300 has identified that network device 108A is not a primary device for a given data communication for which it has received one or more data packets, it may access state information 314 within repository 312, according to some embodiments. State information 314 includes state information for one or more data communications for which network device 108A serves as a non-primary device. Although forwarding engine 300 forwards packets it has received to the primary device within cluster 106 that manages that given data communication, it can also access state information within state information 314 for those packets, such that it knows current state of the communication. In some embodiments, network device 108A populates state information 314 based upon synchronization information for state information that it receives from primary devices within cluster 106 that manage one or more different data communications.

In some embodiments, application layer gateway 301 includes a SIP (Session Initiation Protocol) handler to manage VoIP call-based information. (Presently, SIP is defined within Request For Comments, or RFC, 3261, which has been defined by the Internet Engineering Task Force SIP Working Group.)

In FIG. 3, network device 108A also includes security device manager 304. In some embodiments, network device 108A is a physical device. In these embodiments, security device manager 304 manages the security for the physical network device 108A. In other embodiments, network device 108A is a virtual device within cluster 106, when each of devices 108A-108N are part of one physical network device. In these embodiments, security device manager 304 functions as a virtual security device to manage security for the virtual device 108A. Security device manager 304 may manage one or more virtual security devices for device 108A, wherein the virtual security devices help manage information within repository 312.

As noted above, repository 312 includes state information for various data communications, including data communications for which network device 108A serves as either the primary or non-primary device. Security device manager 304 is capable of managing and updating both state information 314, which includes state information of communications for which network device 108A serves as a non-primary device, and also state information 316, which includes state information of communications for which network device 108A serves as a primary device. Security device manager 304 may also actively manage security protocols used during data transmission through network device 108A.

When forwarding engine 300 receives one or more data packets from an external system, such as enterprise system 100 or 101, and has identified network device 108A as the primary device for handling these packets and associated data communication, security device manager 304 is responsible, in some embodiments, for maintaining and updating state information for the communication within state information 316 of repository 312. This state information can subsequently be sent to, or synchronized with, other non-primary devices within cluster 106, such that all devices within cluster 106 have synchronized state information for the communication.

Synchronization engine 302 synchronizes information between network device 108A and other network devices 108B-108N in cluster 106. When network device 108A is a primary device for a given data communication, thereby managing all data packets associated with that communication, synchronization engine 302 is responsible for synchronizing all state information associated with the communication in state information 316 with other devices 108B-108N. It may do so by periodically providing such state information to the other devices 108B-108N. For example, when network device 108A processes the initial data packets for a communication, such as a voice-based call, synchronization engine 302 may provide initial state information from state information n316 to devices 108B-108N to initially synchronize all devices within cluster 106. Subsequently, as network device 108A receives and processes subsequent data packets associated with the communication, synchronization engine 302 may provide additional state information from state information 316 to devices 108B-108N to continually synchronize all devices within cluster 106. Synchronization engine 302 can provide such information when or after security device manager 304 has updated state information 316, as was described previously. Thus, when network device 108A is a primary device, it manages synchronization of state information for the given communication with all other devices through use of synchronization engine 302.

When, though, network device 108A is not a primary device for a given communication, it may receive synchronization data, such as state information for that communication, from the primary device managing such communication within cluster 106. (The synchronization engine 302 of the primary device may provide this information to device 108A, in these instances.) Synchronization engine 302 of network device 108A is responsible, in these instances, for receiving, processing, and storing such incoming synchronization data within state information 314 for the communication to ensure that network device 108A has updated information concerning that communication. Because network device 108A maintains such state information 314, network device 108A provides redundancy within cluster 106. For example, in the event that the primary device experiences a failure, cluster 106 may determine that network device 108A is to become the new active, primary device for the communication. Because synchronization engine 302 has maintained updated state information associated with this communication in state information 314, network device 108A is in a position to effectively and efficiently take over as the new primary device. If this occurs, security device manager 304 moves the state information for the communication from state information 314 to, or re-associated the state information with, state information 316, since network device 108A is now the primary device.

In some embodiments, the functionality provided by synchronization engine 302 and security device manager 304 may be substantially merged, such that one functional component may be responsible for maintaining state information within repository 312, synchronizing such state information (e.g., state information 314 and/or 316) with other network devices, and managing security for data communications handled by network device 108A. In some embodiments, the functionality provided by forwarding engine 300, synchronization engine 302, and security device manager 304 may be substantially merged within application layer gateway 301.

In some embodiments, various functional components, such as forwarding engine 300, resource manager 308, and/or gate/session manager 310, are capable of accessing repository 312 directly and synchronizing relevant state information within state information 314 and/or 316 to other network devices 108B-108N. In these embodiments, synchronization engine 302 may oversee the overall synchronization process, or may delegate certain synchronization functions to these functional components.

The state information contained within state information 314 and/or 316 provides information related to the state of a given data communication. This information may include resource information for resources that have allocated to the communication, session information, gate information, network-address-translation (NAT) mapping information (if cluster 106 utilizes NAT), pinhole information (for example, with VoIP calls), or other SIP/application-layer gateway information. As noted above, resource manager 308, gate/session manager 310, and even forwarding engine 300 are, in some embodiments, directly involved with the synchronization of state information within repository 312, and may interact with synchronization engine 302.

Flow/policy manager 306 helps manages the various flows of data that are processed by network device 108A. These flows of data may relate to active flows that are processed by network device 108A as the primary device, and also to other flows that are processed when network device 108A may be a non-primary device. In addition, flow/policy manager 306 manages one or more rule-based policies for network device 108A. These policies may be used by network device 108A to determine when or if to take certain actions. For example, these policies may specify that certain actions are forbidden or allowed during processing of data packets for one or more data communications through network device 108A. The policies may also specify whether network device 108A is allowed or prohibited from communicating with other network devices 108B-108N. In certain cases, if a particular network device, such as network device 108B, has failed or is down, flow/policy manager 306 may indicate that network device 108A shall not try and communicate with network device 108B. Flow/policy manager 306 may also indicate which network device 108A-108N is to take over as the primary device for a communication when the prior primary device is down, has failed, or is otherwise unable to proceed with management of the communication, according to some embodiments. Flow/policy manager 306 is also communicatively coupled to repository 312 for accessing and updating relevant state information 314 and/or 316 associated with one or more data communications.

Resource manager 308 manages various resources for network device 108A. In some embodiments, resource manager 308 manages creation or deletion of various groups and resources within network device 108A. These groups and resources may be associated with one or more data communications, such as voice-based calls, that are handled by network device 108A. Thus, various group and resource information managed by resource manager 308 comprises state information that is stored within repository 312. When network device 108A serves as a primary device, such state information is captured within state information 316 and can be managed and synchronized by synchronization engine 302 and security device manager 304. In some embodiments, resource manager 308 received delegated authority to directly synchronize its resource management state information within repository 312 to other network devices 108B-108N.

Gate/session 310 manager manages gate and/or session creation and handling within network device 108A. Gate/session manager 310 is also communicatively coupled to repository 312 for accessing and updating, if necessary, relevant state information 314 and/or 316 associated with one or more data communications, according to some embodiments.

Figure 4:
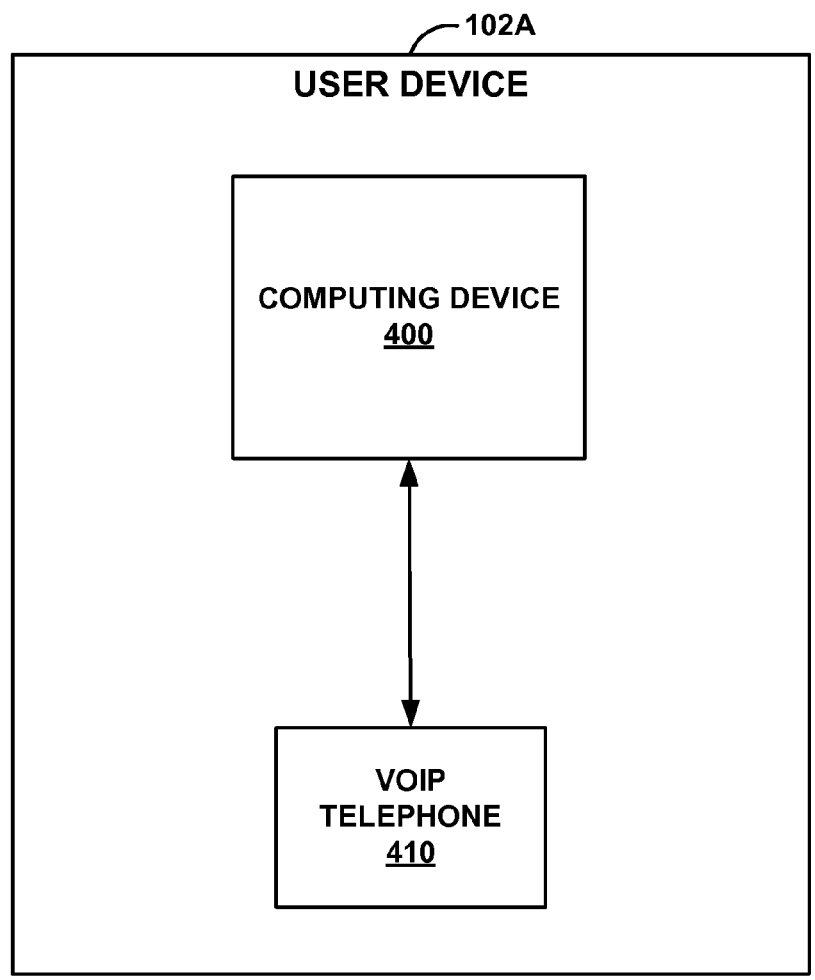
FIG. 4 is a block diagram illustrating additional details of an exemplary user device, according to some embodiments.

FIG. 4 is a block diagram illustrating additional details of an exemplary user device 102A, according to some embodiments. User device 102A is part of enterprise system 100 shown in FIG. 1, and is also part of enterprise system 200 shown in FIG. 1. User device 102A shown in FIG. 4 includes a computing device 400 and a VoIP (voice-over-Internet-Protocol) telephone 410. In some embodiments, other user devices 102B-102N, or user devices 103A-103N (FIGS. 1 and 2), also include these components.

A user, such as a human user, may use and interact with user device 102A. The user may interact with computing device 400 to provide data entry and receive data responses. Computing device 400 includes a processor, a storage medium, an input/output interface, and memory. Computing device 400 may comprise a PC computer, a portable/laptop computer, a handheld device, or other form of computing device known in the art. Computing device 400 is coupled to VoIP telephone 410 in the embodiment of FIG. 4. The user may interact with VoIP telephone 410 to place or receive voice-based calls to users of other user devices (such as users of devices 103A-103N). In these scenarios, the data communications from enterprise system 100 or 200 comprise voice-based calls. Network clusters 106 and 107 are each capable of managing IP (Internet Protocol) data associated with these communications, as is network 202 (FIG. 2).

Figure 5:
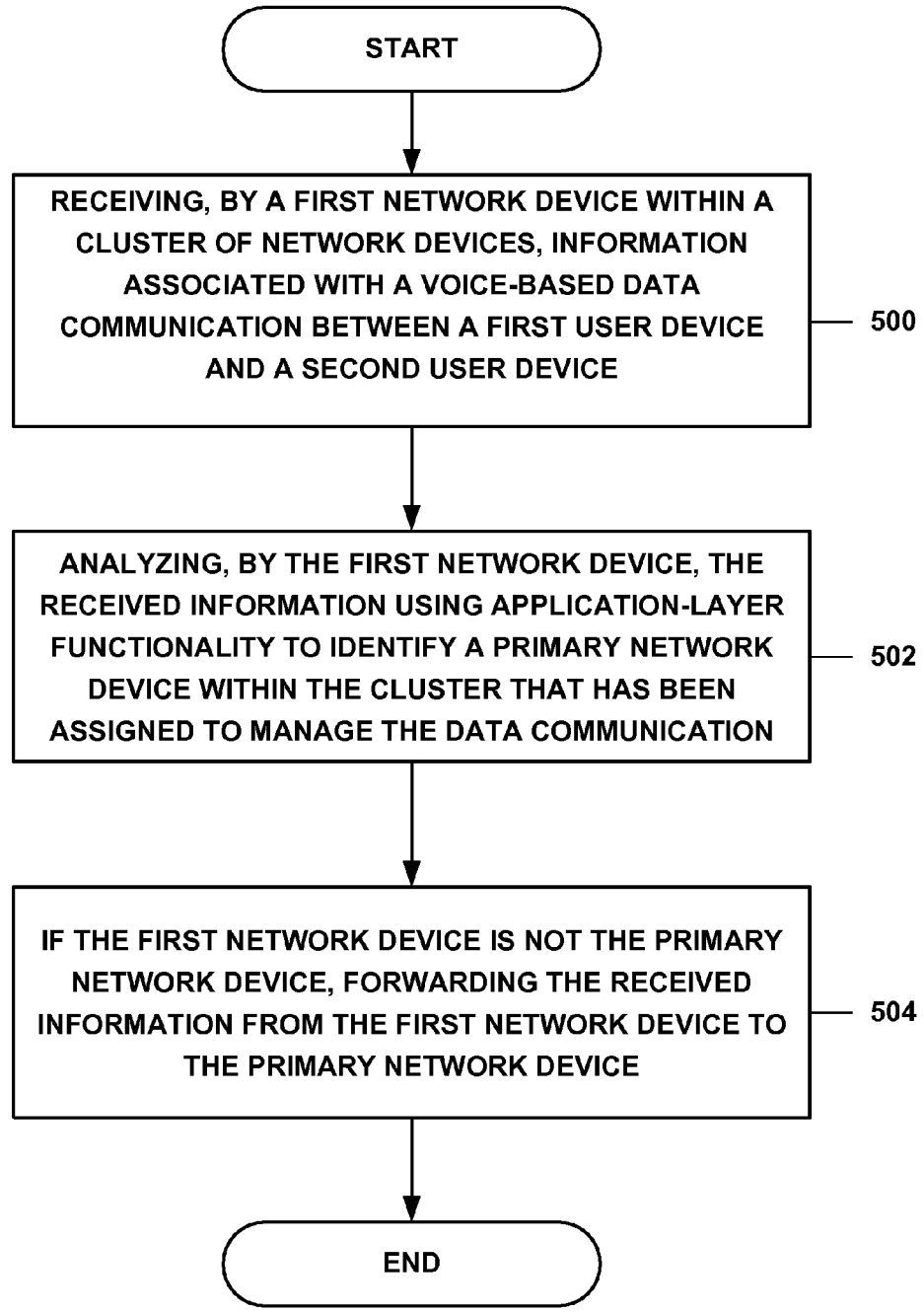
FIG. 5 is a flow diagram illustrating an exemplary method that is performed by a network device, according to some embodiments.

FIG. 5 is a flow diagram illustrating an exemplary method that is performed by a network device, according to some embodiments. For example, the method shown in FIG. 5 may be performed by network device 108A shown in FIG. 3. In some embodiments, the method may be performed by any of the network devices 108A-108N or 109A-109N shown in FIGS. 1-2.

The method shown in FIG. 5 includes acts 500, 502, and 504. For exemplary purposes only, it will be assumed that first network device 108A performs this method, and that a second network device 108B is also included within cluster 106 of devices. In act 500, network device 108A receives information associated with a data communication, such as a voice-based call, between a first user device 102A and a second user device 103A. Upon receipt of this information, network device 108A analyzes, in act 502, the received information using application layer functionality (such as, for example, by using an application layer gateway, such as application layer gateway 301 shown in FIG. 3) to identify a primary network device within cluster 106 that manages the data communication. If network device 108A is not the primary network device, network device 108A, in act 504, forwards the received information from network device 108A to the primary network device. For example, if network device 108B is the primary device for the communication, network device 108A forwards the received information to network device 108B. Various aspects of this method, along with the operable functional components of network devices 108A and 108B, will be further described below with respect to FIGS. 6A, 6B, and 7.

Figure 6A:
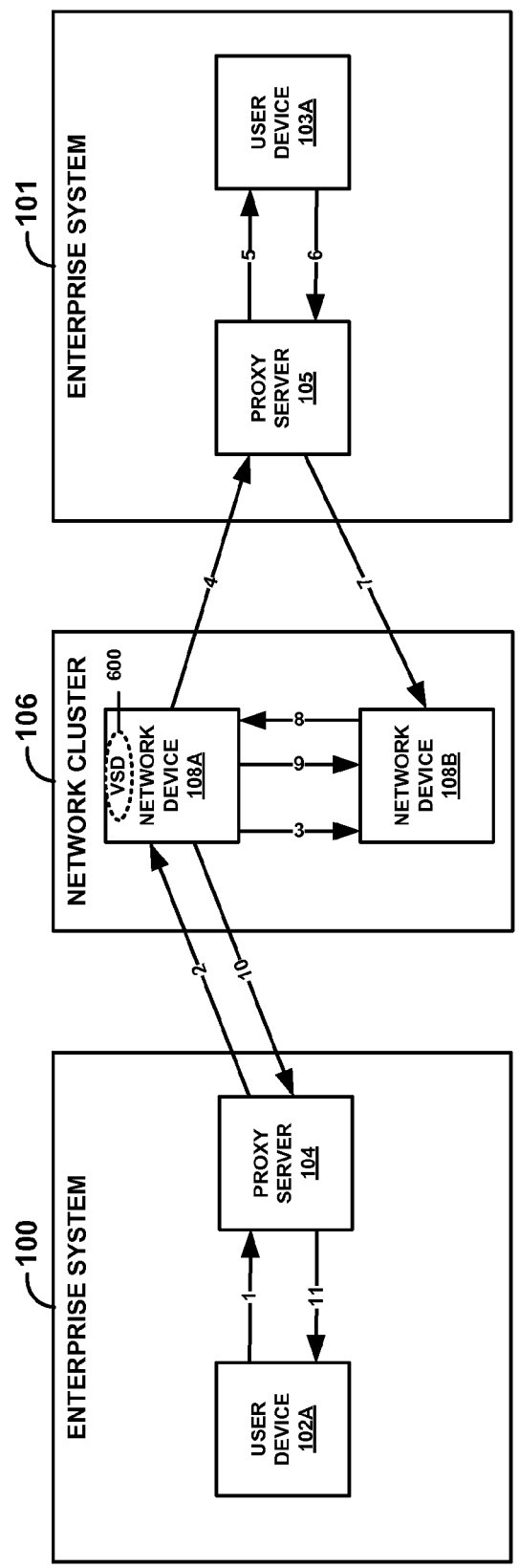
FIG. 6A is a block diagram illustrating an exemplary mode of operation of two enterprise systems that communicate with each other via a network cluster, according to some embodiments.

FIG. 6A is a block diagram illustrating an exemplary mode of operation of two enterprise systems 100 and 101 communicating with each other via network cluster 106.

FIG. 6A shows an example of a system such as the one shown in FIG. 1, wherein enterprise system 100 includes one user device 102A, enterprise system 101 includes one user device 103A, and network cluster 106 includes two network devices 108A and 108B. User device 102A is able to communicate with user device 103A via network cluster 106. For example, user device 102A may be able to establish a data communication, such as a voice-based call, with user device 103A. If the network cluster 106 supports communication using the Internet Protocol (IP), then user device 102A is capable of establishing a VoIP call with user device 103A. For purposes of illustration, it will be assumed that user device 102A wishes to establish such a VoIP call with user device 103A in the example shown in FIGS. 6A and 6B, and that user devices 102A and 103A each include VoIP-activated phones or devices (such as VoIP phone 410 shown in FIG. 4). However, it shall be well understood that various other forms of data communication may also be implemented by the general techniques described hereinafter.

To establish a VoIP call, user device 102A of enterprise system 100 sends a request, or a call invitation, to user device 103A, using an application protocol, such as SIP (session initiation protocol). This request is routed through proxy server 104, network cluster 106, and proxy server 105 so that it may be delivered to user device 103A. FIG. 6A shows a series of numbered arrows to indicate the sequence of data packets, or information, that is sent from one entity to another.

First, user device 102A sends the request to proxy server 104. Proxy server 104 is responsible for communicating with entities external to enterprise system 100. Proxy server 104 then routes the request to network cluster 106. In some embodiments, where enterprise system 100 does not include proxy server 104, user device 102A is capable of sending the request directly to cluster 106.

When cluster 106 receives the request, it determines which network device within cluster 106 shall process the request, according to some embodiments. In these embodiments, cluster 106 is able to implement load balancing, such that information flow through cluster 106 is balanced amongst network devices included within cluster 106, such as network devices 108A and 108B. Proxy server 104 may generically address the request to cluster 106, such as by using an IP address associated with cluster 106, and then cluster 106 determines which device will process the request. In the example shown in FIG. 6A, cluster 106 has determined to route the message to network device 108A.

Because network device 108A is initially selected by cluster 106 when processing the initial request related to the VoIP call, network device 108A is identified as the primary, or active, device for the call. As a result, network device 108A will manage and process all subsequent information packets related to this specific call, at least as long as it continues to serve as the primary, active device for the call. Network device 108A may therefore initially provide the egress interface for the VoIP call.

Because it is the primary device for the call, network device 108A maintains all primary state information for the call, and serves as the active virtual security device (VSD) for the call. As shown in FIG. 6A, network device 108A manages active VSD 600 for the call. Security device manager 304 (FIG. 3) of application layer gateway 301 in network device 108A manages active VSD 600. Network device 108A is capable of maintaining state information 316 for the call within repository 312. Exemplary state information may include session information, VoIP pinhole information, or event NAT (network-address translation information) information if cluster 106 implements NAT or includes NAT devices that interact with devices 108A and 108B.

Before sending the request to enterprise system 101, network device 108A synchronizes its state information 316 for the call with network device 108B. To do so, synchronization engine 302 of network device 108A sends its state information 316 to network device 108B. Within network device 108B, synchronization engine 302 may receive this information and store it within its repository 312 as state information 314, since network device 108B acts as the non-primary (or non-active) device for the call. However, by synchronizing the initial state information for the call, network device 108B maintains up-to-date information, in case it may later need to serve as the primary, active device for the call (such as, for example, if there is a failure with network device 108A). Flow/policy manager 306, resource manager 308, and/or gate/session manager 310 of network device 108A may also be involved when processing the request.

Network device 108A then sends the request, via forwarding engine 300, to proxy server 105 of enterprise system 101. Proxy server then routes the request to user device 103A, which may also include a VoIP-activated phone or device. When the VoIP phone rings, user device 103A sends a message (which may include one or more data packets) back to proxy server 105 indicating that the device is ringing. Proxy server 105 sends this message to cluster 106 so that it may be delivered to user device 102A, such as by addressing the message to an IP address associated with cluster 106.

Once again, cluster 106 determines which network device will process the message. By implementing a load-balancing routine, cluster 106 determines that network device 108B will handle the message. Because cluster 106 is a high-availability, it routes messages to network devices to achieve load balancing, regardless of which calls to which these messages pertain, according to some embodiments. Cluster 106 assumes that individual network devices, such as devices 108A and 108B, will manage the processing of call-specific messages.

When network device 108B receives the message, it utilizes its forwarding engine 300, and also accesses state information 314 within its repository 312, to determine that it is not the activated, primary device to handle data packets associated with this particular data communication between user device 102A and user device 103A. It instead identifies network device 108A as the primary device. Network device 108B may also utilize its flow/policy manager 306, resource manager 308, and/or or gate/session manger 310 when analyzing and processing the received message. If it determines that it should forward the message, network device 108B uses its forwarding engine 300 to forward the message to network device 108A.

Network device 108A receives and processes the message using its forwarding engine 300. It may also use its flow/policy manager 306, resource manager 308, and/or or gate/session manger 310 when processing the message. In addition, security device manager 304 manages VSD 600, which updates state information 316 for the call within repository 312 based upon current state and receipt of the message. Network device 108A is thereby able to confirm that it is the primary device for the call. To synchronize call state with network device 108B, synchronization engine 302 of network device 108A provides its state information 316 to network device 108B. Synchronization engine 302 of network device 108B stores this information in its repository 312 as updated state information 314 associated with the call, since device 108B is a non-primary device for the call.

After synchronization, network device 108A sends the message for the call to proxy server 104 using its forwarding engine 300. Proxy engine 104 then routes the message to user device 102A, indicating that a VoIP-activated phone connected to user device 103A is ringing.

Once a user of user device 103A picks up the phone, a media session is established between user device 102A and user device 103A for the call. All information, including data packets, associated with the call are handled and managed by network device 108A as the primary, active device for the call. Any information associated with the call that is received by network device 108B is forwarded to network device 108A as the primary device, as shown in FIG. 6A. However, before the call ends, it is possible that network device 108A experiences a failure or some sort, such as a hardware or software failure. For example, network device 108A may experience some form of device failure, or may experience a failure related to operation of VSD 600 or security operations within the device. In this case, for fail-over purposes, network device 108B may need to take over as the active, primary device for the call in case of such a failure.

Figure 6B:
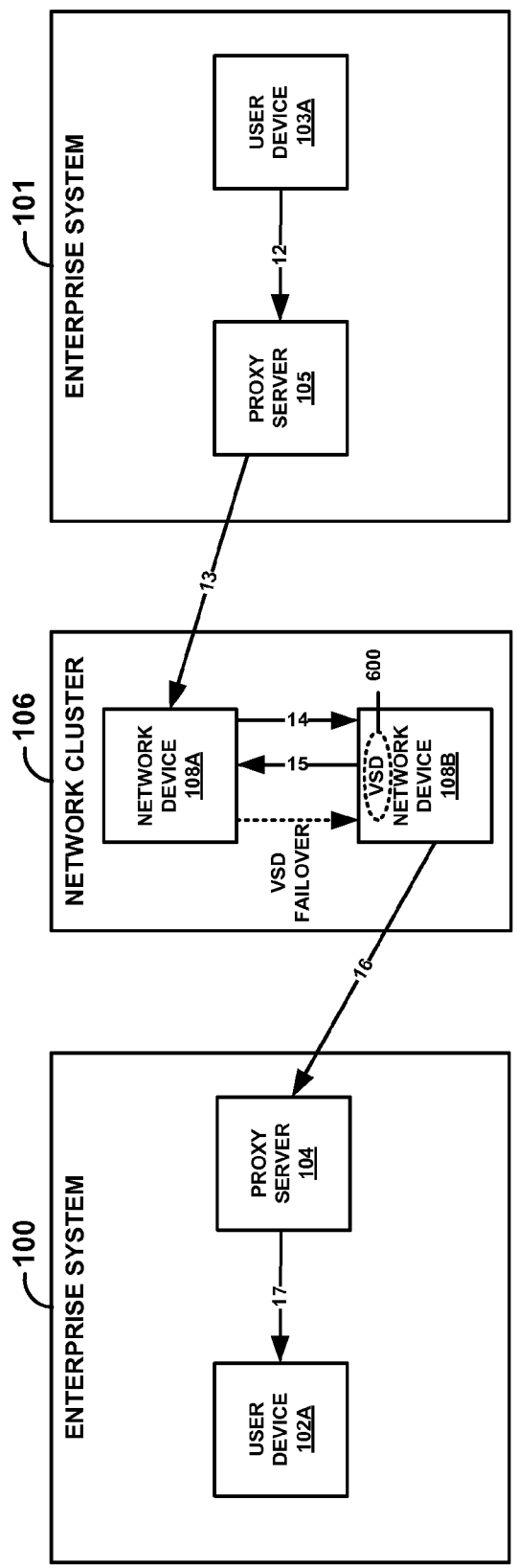
FIG. 6B is a block diagram illustrating an exemplary mode operation for the switchover of a virtual security device in the case of a failure of one network device, according to some embodiments.

FIG. 6B is a block diagram illustrating an exemplary mode operation in the case of such a failure. In this example, network device 108A experiences a failure, such as a failure in implementing VSD 600. As a result, there is a failover of VSD 600 to network device 108B, such that network device 108B becomes the primary, active device for the call, and takes over management of VSD 600 as the active device. Security device manager 304 of network device 108B controls management of VSD 600. Because network device 108B has received updated state information from network device 108A up to this point, network device 108B has up-to-date information for the call, and is capable of taking over as the primary managing device for the call in moving forward. Because it is now the primary device, network device 108B moves, or re-designates, the state information for the call as state information 316 within its repository 312. In addition, because network device 108A is no longer the primary device for the call, it can move, or re-designate, the state information for the call as state information 314 within its repository 312.

In FIG. 6B, the next message, or set of data packets, is sent by user device 103A to proxy server 105. Proxy server 105 then sends the message to cluster 106. Within the load-balancing environment, cluster 106 determines to route the message to network device 108A in the example of FIG. 6B.

However, network device 108A analyzes the message, accesses its repository 312, and identifies network device 108B as the current, primary device handling information for the call. As a result, network device 108A forwards the message to network device 108B.

Upon receipt of the message, network device 108B confirms that it is the primary device for the call. It then updates its state information 316 for the call based upon receipt of the message and any information associated with the message. In addition, it provides synchronization with network device 108A by sending its state information 316 to network device 108A. Network device 108A stores this information within its repository 312 as state information 314, since it is no longer the primary device.

Network device 108B then sends the message to proxy server 104. Proxy server 104 routes the message to user device 102A. In this fashion, network device 108B is capable of taking over as the primary device for the call when the previous primary device 108A experiences some form of a failure. As a result, network devices 108A and 108B provide failover and redundancy capabilities to help implement a high-availability network environment when managing one or more data communications between enterprise systems 100 and 101.

Figure 7:
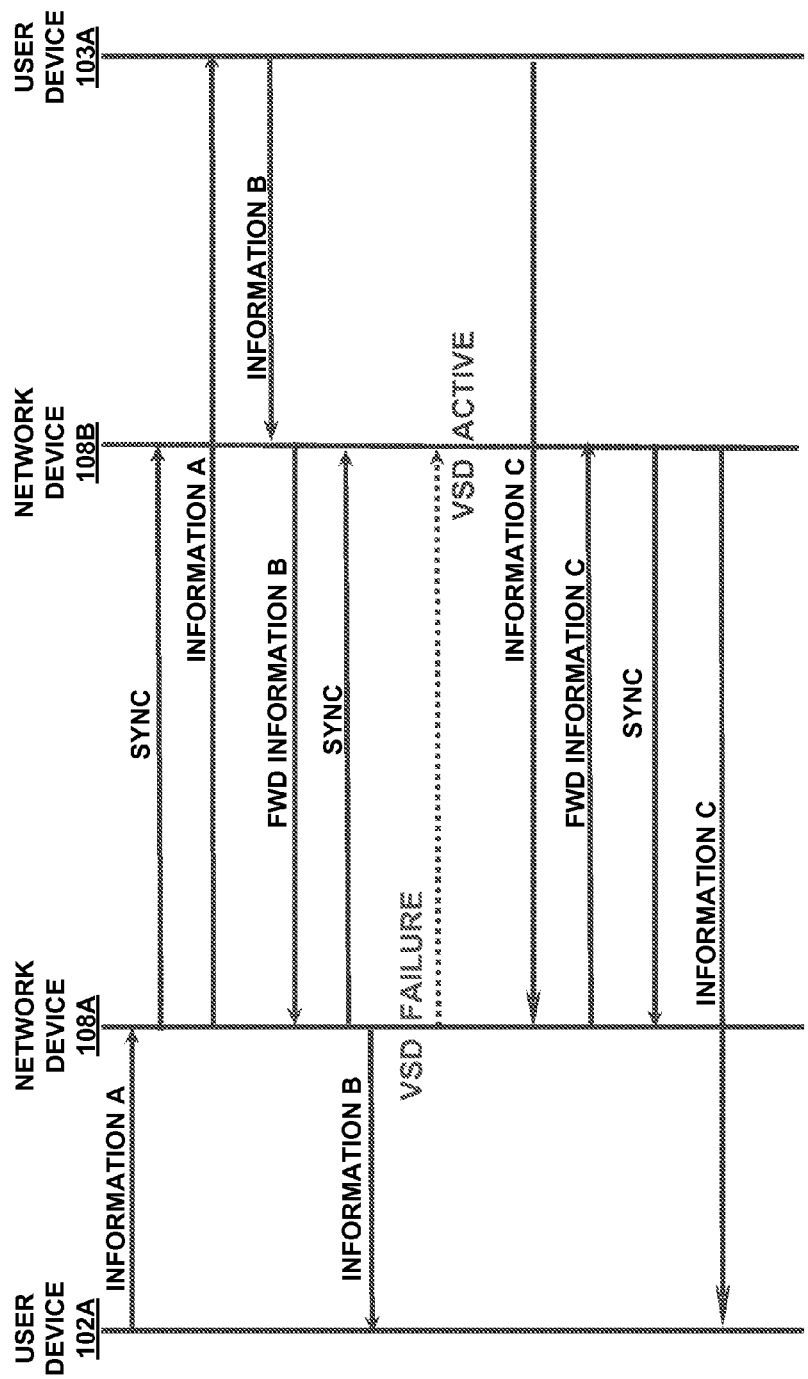
FIG. 7 is an interaction diagram further illustrating the operations shown in FIGS. 6A and 6B.

FIG. 7 is an interaction diagram further illustrating the operations shown in FIGS. 6A and 6B. FIG. 7 shows an initial flow of information from user device 102A to network device 108A via cluster 106, when network device 108A has been initially identified as the primary device. (Proxy servers 104 and 105 are not included within FIG. 7.) Network device 108A synchronizes network device 108B by providing state information for the call to network device 108B. Network device 108A then sends the information (labeled "INFORMATION A") to user device 103A.

User device 103A then sends "INFORMATION B" to cluster 106, which determines, for load-balancing reasons, that network device 108B will initially process the information. Because it is not the primary device, network device 108B forwards the information to network device 108A. Upon receipt of "INFORMTATION B", network device 108A provides updated state information to network device 108B, and then routes the information to user device 102A.

Subsequently, network device 108A experiences a failure, and network device 108B takes over as the primary device, thereby taking over active management of VSD 600. User device 103A then later sends "INFORMATION C" to cluster 106, which determines, for load-balancing reasons, that network device 108A will initially process the information. Because network device 108A is no longer the primary device, it forwards the information to network device 108B. Network device 108B confirms that it is the primary device, and provides updated state information to network device 108A. Network device 108B then sends "INFORMATION C" to user device 102A.

In one or more exemplary embodiments, the functions described above may be implemented in hardware, software, firmware, or any combination thereof. If implemented in software, the functions may be stored on or transmitted over as one or more instructions or code on a computer-readable medium that may be executed by a processor, such as a processor of one or more of network devices 108A-108N and 109A-109N. Computer-readable media includes both computer storage media and communication media including any medium that facilitates transfer of a computer program from one place to another. A storage media may be any available media that can be accessed by a computer. By way of example, and not limitation, such computer-readable media can comprise random-access memory (RAM), read-only memory (ROM), Electrically Erasable Programmable ROM (EEPROM), Compact Disc ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), and floppy disk. Combinations of the above should also be included within the scope of computer-readable media.

Various embodiments of the invention have been described. These and other embodiments are within the scope of the following claims.

The invention claimed is:

1. A method comprising:

receiving, by a network device within a cluster of multiple network devices, information associated with a previously established voice-based data communication between a first user device and a second user device, wherein the information from the first user device or the second user device comprises one or more data packets associated with the voice-based data communication, wherein the cluster provides load-balancing functionality in which the multiple network devices within the cluster may handle different data packets associated with the voice-based data communication, and wherein the received information from the first user device or the second user device is addressed to the cluster and routed to the network device according to the load-balancing functionality;

analyzing, by the network device, the received information using application-layer functionality to identify a primary network device within the cluster that is currently managing all data for the voice-based data communication between the first user device and the second user device;

maintaining state information on the network device that provides information related to a state of the voice-based data communication, the state information including at least one of session information and pinhole information for the voice-based data communication;

when the network device is not currently the primary network device, forwarding the received information from the network device to the primary network device, and subsequently receiving, by the network device and from the primary network device, updated state information that provides updated information related to the state of the voice-based data communication based on the received information, the updated state information including at least one of updated session information and updated pinhole information for the voice-based data communication; and when the primary network device experiences a failure, managing, by the network device, subsequent data packets associated with the voice-based data communication using the updated state information, such that the network device becomes a new primary device.

2. The method of claim 1, wherein analyzing the received information to identify the primary network device within the cluster comprises:
- analyzing a portion of the received information that identifies the data communication; and
- comparing the portion of the received information with the state information maintained by the network device to identify the primary network device that is currently managing the data communication.

3. The method of claim 2, wherein the portion of the received information comprises a unique communication identifier for the data communication.

4. The method of claim 1, wherein forwarding the received information from the network device to the primary network device comprises forwarding the received information from the network device to the primary network device when a policy manager of the network device allows such forwarding to the primary network device.

5. The method of claim 1, wherein when the network device is currently the primary network device, the method further comprises forwarding the received information from the network device to at least one of the first user device and the second user device.

6. The method of claim 5, wherein when the network device is currently the primary network device, the method further comprises:
- updating the state information based upon the received information; and
- synchronizing the state information with all other network devices within the cluster.

7. A non-transitory computer-readable storage medium comprising one or more instructions that, when executed, cause a processor to:
- receive, by a network device within a cluster of multiple network devices, information associated with a previously established voice-based data communication between a first user device and a second user device, wherein the information from the first user device or the second user device comprises one or more data packets associated with the voice-based data communication, wherein the cluster provides load-balancing functionality in which the multiple network devices within the cluster may handle different data packets associated with the voice-based data communication, and wherein the received information from the first user device or the second user device is addressed to the cluster and routed to the network device according to the load-balancing functionality;
- analyze, by the network device, the received information using application-layer functionality to identify a primary network device within the cluster that is currently managing all data for the voice-based data communication between the first user device and the second user device;
- maintain state information on the network device that provides information related to a state of the voice-based data communication, the state information including at least one of session information and pinhole information for the voice-based data communication;
- when the network device is not currently the primary network device, forward the received information from the network device to the primary network device, and subsequently receive, by the network device and from the primary network device, updated state information that provides updated information related to the state of the voice-based data communication based on the received information, the updated state information including at least one of updated session information and updated pinhole information for the voice-based data communication; and
- when the primary network device experiences a failure, manage, by the network device, subsequent data packets associated with the voice-based data communication using the updated state information, such that the network device becomes a new primary device.

8. A network device, comprising:
- a processor;
- an engine executable by the processor and configured to receive information associated with a previously established voice-based data communication between a first user device and a second user device, and further configured to analyze the received information using application-layer functionality to identify a primary network device that is currently managing all data for the voice-based data communication within a cluster of multiple network devices, wherein the information from the first user device or the second user device comprises one or more data packets associated with the voice-based data communication, wherein the cluster provides load-balancing functionality in which the multiple network devices within the cluster may handle different data packets associated with the voice-based data communication, and wherein the received information from the first user device or the second user device is addressed to the cluster and routed to the network device according to the load-balancing functionality;
- state information maintained by the network device, wherein the state information includes at least one of session information and pinhole information for the voice-based data communication; and
- a synchronization engine,
- wherein when the network device is not currently the primary network device, the engine is further configured to forward the received information from the network device to the primary network device, and the synchronization engine of the network device is configured to subsequently receive from the primary network device updated state information that provides updated information related to the state of the voice-based data communication based on the received information, the updated state information including at least one of updated session information and updated pinhole information for the voice-based data communication, and
- wherein when the primary network device experiences a failure, the network device manages subsequent data packets associated with the voice-based data communication using the updated state information, such that the network device becomes a new primary device.

9. The network device of claim 8, wherein the network device comprises at least one of a physical network device, a virtual network device, and a firewall.

10. The network device of claim 8, wherein the engine is further configured to:
- analyze a portion of the received information that identifies the data communication; and
- compare the portion of the received information with the state information maintained by the network device to identify the primary network device that is currently managing the data communication.

11. The network device of claim 10, wherein the portion of the received information comprises a unique communication identifier for the data communication.

12. The network device of claim 8, wherein when the network device is currently the primary network device, the engine is further configured to forward the received information from the network device to at least one of the first user device and the second user device.

13. The network device of claim 12, further comprising:
a security device configured to maintain the state information on the network device for the data communication and update the state information based upon the received information,
wherein the synchronization engine is configured to synchronize the state information with at least one other network device within the cluster.

14. A network device, comprising:
means for receiving, within a cluster of multiple network devices, information associated with a previously established voice-based data communication between a first user device and a second user device, wherein the information from the first user device or the second user device comprises one or more data packets associated with the voice-based data communication, wherein the cluster provides load-balancing functionality in which the multiple network devices within the cluster may handle different data packets associated with the voice-based data communication, and wherein the received information from the first user device or the second user device is addressed to the cluster and routed to the network device according to the load-balancing functionality;
means for analyzing the received information to identify a primary network device within the cluster that is currently managing all data for the voice-based data communication between the first user device and the second user device;
means for maintaining state information on the network device that provides information related to a state of the voice-based data communication, the state information including at least one of session information and pinhole information for the voice-based data communication;
when the network device is not currently the primary network device, means for forwarding the received information to the primary network device, and means for subsequently receiving, by the network device and from the primary network device, updated state information that provides updated information related to the state of the voice-based data communication based on the received information, the updated state information including at least one of updated session information and updated pinhole information for the voice-based data communication; and
when the primary network device experiences a failure, means for managing subsequent data packets associated with the voice-based data communication using the updated state information, such that the network device becomes a new primary device.

15. A method comprising:
receiving, by a first network device within a cluster of multiple network devices, a request from a first user device using an application-layer protocol to establish a voice-based data communication with a second user device;
activating the first network device as a primary device using application-layer functionality, such that the first network device processes all subsequent data packets for the voice-based data communication between the first and second user devices;
storing, by the first network device, initial state information in a state information repository, the initial state information being associated with the request and including at least one of session information and pinhole information for the voice-based data communication;
sending the initial state information associated with the request from the first network device to all other network devices within the cluster using application-layer functionality, wherein the cluster provides load-balancing functionality in which the multiple network devices within the cluster may subsequently handle different data packets associated with the voice-based data communication;
sending the request from the first network device to the second user device to establish the data communication with the second user device;
upon receiving one or more subsequent data packets associated with the data communication by the first network device, storing updated state information in the state information repository of the first network device, the updated state information including at least one of updated session information and updated pinhole information for the voice-based data communication;
sending the updated state information from the first network device to all other network devices within the cluster using the application-layer functionality; and
experiencing a failure in the first network device,
wherein, responsive to the failure, a second network device within the cluster is activated as the primary device using application-layer functionality, such that the second network device processes subsequent data packets associated with the voice-based data communication using the updated state information.

16. The method of claim 15, further comprising:
sending the one or more subsequent data packets from the first network device to the first user device or the second user device.

17. The method of claim 16, wherein receiving the one or more subsequent data packets associated with the data communication comprises receiving the one or more subsequent data packets from another network device within the cluster.

18. The method of claim 15, wherein the application-layer protocol comprises a session-initiation protocol (SIP).

19. The method of claim 15, wherein sending the request from the first network device is performed after sending the initial state information from the first network device to all other network devices within the cluster.

20. A non-transitory computer-readable storage medium comprising one or more instructions that, when executed, cause a processor to:
receive, by a first network device within a cluster of multiple network devices, a request from a first user device using an application-layer protocol to establish a voice-based data communication with a second user device;
activate the first network device as a primary device using application-layer functionality, such that the first network device processes all subsequent data packets for the voice-based data communication between the first and second user devices;
store, by the first network device, initial state information in a state information repository, the initial state information being associated with the request and including at least one of session information and pinhole information for the voice-based data communication;
send the initial state information associated with the request from the first network device to all other network devices within the cluster using application-layer functionality, wherein the cluster provides load-balancing functionality in which the multiple network devices within the cluster may subsequently handle different data packets associated with the voice-based data communication;

send the request from the first network device to the second user device to establish the voice-based data communication with the second user device;

upon receiving one or more subsequent data packets associated with the voice-based data communication by the first network device, store updated state information in the state information repository of the first network device, the updated state information including at least one of updated session information and updated pinhole information for the voice-based data communication;

send the updated state information from the first network device to all other network devices within the cluster using the application-layer functionality; and experience a failure in the first network device, wherein, responsive to the failure, a second network device within the cluster is activated as the primary device using application-layer functionality, such that the second network device processes subsequent data packets associated with the voice-based data communication using the updated state information.

* * * * *